United States Patent Office 3,523,916
Patented Aug. 11, 1970

3,523,916
ADDITIVE DISPERSANT
Donald G. Needham and George R. Hill, Bartlesville, Okla., assignors to Phillips Petroleum Company, a corporation of Delaware
No Drawing. Filed Jan. 26, 1967, Ser. No. 611,832
The portion of the term of the patent subsequent to Oct. 1, 1985, has been disclaimed
Int. Cl. B65d 25/14; B23b 27/00; C08j 1/20
U.S. Cl. 260—2.5                                         9 Claims

ABSTRACT OF THE DISCLOSURE

Blends, useful in the production of containers, are produced by admixing polymers of 1-olefins or chloro-olefins with a pigment and a dispersing agent such as polyisobutylene or butyl stearate.

---

A process for dispersing pigments into polymers of 1-olefins, particularly polymers of ethylene and propylene and chloro-olefins, such as polyvinylidene chloride, by admixing the polymers, the pigment, and a dispersing agent, such as liquid polyisobutylene having a molecular weight of about 1000 or butyl stearate, to produce a blend. Blends containing one or more of these polymers, from about 0.5 to about 2 weight percent pigment and from about 0.1 to 0.6 weight percent dispersing agent. Also molded articles of the blend, such as laminates, ribbon and foamed sheet.

This invention relates to the dispersion of pigments. In one aspect it relates to the dispersion of pigments in polymers of olefins and chloro-olefins. In another aspect it relates to uniformly pigmented polyolefin compositions, particularly polymers of ethylene and propylene. In another aspect the invention relates to a uniformly pigmented chloro-olefin composition, particularly solutions of polyvinylidene chloride.

The incorporation of pigment into solid polymers of 1-olefins, such as polyethylene and polypropylene, and chloro-olefins such as polyvinylidene chloride, by the use of dispersants such as mineral oil, polyethylene glycol, and dioctyl phthalate has been known. However, problems of obtaining uniform dispersion of the pigment in the polymer have resulted in the blends not being uniform and having a tendency to bleed or form speckled products. Further, there is a tendency for the formation of agglomerates or clumps of undispersed pigment in the polymer which are difficult or impossible to break up, and these agglomerates form points of weakness leading to failure of fabricated articles in which they occur.

The present invention relates to a process for uniformly dispersing inorganic and/or organic pigments into polymers of 1-olefins, particularly polymers of ethylene and propylene, and chloro-olefins, such as polyvinylidene chloride, and copolymers and blends thereof. Further, the present invention relates to the articles formed by the process for uniformly dispersing inorganic and/or organic pigments into polymers.

Pigment, as used in the present invention, includes both organic and inorganic solvent dyes, the dyes being either in the liquid form or the solid form.

An object of the invention is to provide a process for the production of uniformly pigmented polymers of 1-olefins, vinylidene chloride and copolymers and blends thereof.

Another object of the invention is to provide a pigmented polymer of ethylene and/or propylene in which the pigment particles are very finely divided and uniformly dispersed therein and in which there are no large pigment agglomerates.

Another object of the invention is to provide a pigmented polyvinylidene chloride in which the pigment particles are very finely divided and uniformly dispersed therein.

Another object of the invention is to provide articles of manufacture having uniform coloration and/or an article coated with a uniformly pigmented substance.

Other objects, aspects, and advantages of the present invention will be apparent to those skilled in the art from a study of the disclosure and the appended claims.

In accordance with the present invention, we have now discovered that inorganic and organic pigments and other additives can be uniformly incorporated into polymers of 1-olefins and/or polymers of chloro-olefins, especially polymers of ethylene, propylene and vinylidene chloride, by admixing the pigments and the polymer with butyl stearate or low molecular weight liquid polyisobutylene.

Further, we have found that low molecular weight liquid polyisobutylene and butyl stearate are superior to conventional dispersants, and the small amount of polyisobutylene or butyl stearate required to disperse the pigment are such that they do not affect the properties of the finished product. As processing of the final blend continues, the polyisobutylene or butyl stearate becomes incorporated into the polymer with which it is compatible.

Further, we have found that the pigment dispersion in low molecular weight polyisobutylene or butyl stearate can vary depending upon the pigment content desired in the final polymer blend. In general, it is preferred to form a final polymeric product containing from about 0.5 to about 2 weight percent finely divided pigment dispersed therein and from about 0.1 to about 0.6 weight percent polyisobutylene or butyl stearate, although higher pigment contents can be prepared when desired. The liquid polyisobutylene, having a molecular weight of about 1000, and the butyl stearate, the dispersing agents, act as wetting agents thereby effectively coating the pigment onto the surface of the solid polymer.

Further, we have found that suitable dispersions of pigment in the final blend can be achieved by first coating the polyolefin fluff or pellets with small amounts of liquid polyisobutylene and/or butyl stearate and then blending the coated pellets and/or fluff with the pigment. Likewise, the polyolefin fluff and/or pellets, the liquid polyisobutylene or butyl stearate and the pigment can be blended in a high speed blender in a one step embodiment.

The pigments employed in the present invention can be any well known inorganic and/or organic pigments ordinarily blended with polymers, such as pigments contained in solvent dyes. Examples of suitable inorganic pigments which can be used in accordance with the present invention are iron oxide, ceramic black, chromium oxide, ultramarine blue, iron blue, chrome-cobalt-aluminum, cobalt aluminate, ceramic yellows, titanium pigments, zinc chromate, molybdate, chrome, cadmium sulfide, manganese, chrome-tin, cadmium mercury, cadmium sulfo-selenide, zinc-oxide, zinc sulfide and titanium dioxide.

Examples of suitable organic pigments are bone black, carbon black, indanthrone, phthalocyanine green, phthalocyanine blue, naphthol, pyrazolone, red lake C, thioindigoid, helio bordeaux, alizarine maroon, pigment scarlet, Na-Ba-Ca-lithols, lithol, and quinacridone.

In the practice of the invention, it is necessary that the concentration of pigment in the dispersion be adjusted to provide the desired proportion of pigment to polymer in the master batch and at the same time provide an amount of wetting agent sufficient to disperse the pigment. The mixture formed on admixing the polymer, the wetting agent, and the pigment is agitated in a mixer, such as a roll mill, or other suitable means, for at least 3 minutes to ensure a complete mixing of the ingredients in the mixer. The time required to ensure a complete mixing of the ingredients will vary depending upon the concentration of pigment desired in the final product. The 1-olefin polymers used in the present invention include homopolymers and copolymers of 1-olefins having from 2 to about 4 carbon atoms per molecule, such as ethylene, propylene, 1-butene, blends thereof, and chloro-olefins having from 2 to 4 carbon atoms per molecule, such as vinylidene chloride. The preferred polyolefins include ethylene homopolymers, propylene homopolymers and copolymers of ethylene with at least one olefin having up to four carbon atoms per molecule, for example 1-butene, 2-butene, and isobutylene. The preferred chloro-olefin polymer is polyvinylidene chloride.

The polyolefins or 1-olefin polymers and chloro-olefins that can be pigmented by the practice of the invention can be prepared by any of the well known methods which are usually employed in the preparation of these polymers. One well known method for preparing polymers of 1-olefins is the chromium oxide-catalyzed polymerization described in the Hogan et al. patent, U.S. 2,825,721 (1958). The polyolefins prepared by Hogan et al. are characterized by their high density. Polymers of ethylene, including homopolymers and copolymers, prepared by this method generally have a density ranging from 0.92 to 0.99, ordinarily 0.93 to 0.97. Likewise, polymers of propylene, including homopolymers and copolymers, have a density ranging from about 0.89 to 0.92 and preferably about 0.91 can be pigmented by the practice of the present invention.

The pigment compositions of this invention can have widely different uses. For example, liquid polyisobutylene, having a molecular weight of approximately 1000, provides a good dispersion for pigments which can then be blended into a solution of polyvinylidene chloride which is used to coat polyolefin containers. It has also been found that butyl stearate can be used for the same purpose. Thus, pigmented polyvinylidene chloride can be applied to food containers such as margarine tubs. Similarly, low molecular weight liquid polyisobutylene has been used as a dispersant for pigments upon polyolefins. As the blending of the three constituents progresses, the polyisobutylene or butyl stearate becomes incorporated into the polymer with which it is compatible. Articles made from these blends show uniform coloration and no bleeding or spottiness as do articles made using conventional dispersants such as mineral oil, polyglycol, and dioctyl phthalate.

The following examples are given to better illustrate the invention, but in no way should be understood to limit the invention unnecessarily.

EXAMPLE I

Two hundred pounds of polypropylene resin having a density of 0.92 and a melt flow of 3-4, 3 pounds of pigment, such as Harmon R-6 Red Lake M, marketed by Allied Chemical Corp., National Aniline Division, and 1 pound of liquid polyisobutylene having a molecular weight of about 1000 were admixed in a Henschel mixer for a period of about 5 minutes. During the mixing of the three compounds mentioned above the temperature was allowed to rise in the mixer to about 150° F. After the mixing period the mixture was extruded to form pellets. The pellets and 0.2 pound of polyisobutylene were then blended for about 5 minutes on a rotary drum blender. After the initial mixing of the pellets and the polyisobutylene 0.4 pound of azobisformamide (Celogen AZ, marketed by Naugatuck Company) was added to the drum blender and blending was continued for an additional 10 minutes. The resulting blend was then extruded into the form of an 18 mil foam sheet. The foam sheet was then stretched to form a 6 mil thick oriented sheet. Upon examination of the oriented sheet it was evident that there was no bleeding or spotting of the pigment in the sheet, and the product disclosed a higher gloss finish than products formed without the addition of polyisobutylene as a wetting agent and dye dispersant.

EXAMPLE II

A series of runs was made using the procedure of Example I but the pigment used was different. In one run the pigment was phthalocyanine blue, and in another run the pigment was phthalocyanine green. The products formed with these pigments also disclosed no bleeding or spotting of the pigment in the sheet and the product was provided with a higher gloss finish than products formed without the addition of low molecular weight liquid polyisobutylene as the wetting agent and dye dispersant.

Examples I and II clearly demonstrate the use of the low molecular weight liquid polyisobutylene as a dye dispersant and wetting agent for organic dyes.

EXAMPLE III

In order to determine the use of the low molecular weight liquid polyisobutylene as a dye dispersant and wetting agent for inorganic pigments the following run was conducted. Fifty pounds of polyethylene resin having a density of 0.960 and a melt index of 0.9, was admixed with 0.05 pound of low molecular weight liquid polyisobutylene and 0.1 pound of iron oxide pigment in a blender for about 5 minutes. At the end of the 5 minute mixing period 0.5 pound of a blowing agent, azobisformamide, and 0.1 pound of carbon black pigment, Thermax Black (marketed by Thermatic Corporation) were added to the blender and the resulting mixture was admixed for an additional 10 minutes at room temperature. At the end of the desired blending period the blend was then foam extruded to produce a wastepaper basket which exhibited superior coloration and no bleeding of the pigment.

Example IIII clearly illustrates the advantageous results achieved in the use of a low molecular weight liquid polyisobutylene as a pigment dispersant and wetting agent for an inorganic pigment.

EXAMPLE IV

In order to demonstrate the operability of low molecular weight liquid polyisobutylene and butyl stearate as a pigment dispersant in a polyvinylidene chloride the following runs were conducted.

In one run 10 parts of pigment, Harmon R-6 Red Lake M, marketed by Allied Chemical Corp., National Aniline Division, and liquid polyisobutylene having a molecular weight of about 1000 were admixed in a paddle blender operating at about 500 r.p.m. for 5 minutes to form a dye concentrate of the pigment and the liquid polyisobutylene. After the formation of the dye concentrate, 0.5 part by weight of the dye concentrate were admixed with 99.5 parts by weight of the polyvinylidene chloride in solution in a paddle blender for 5 minutes, the paddle blender operating at 500 r.p.m. The resulting blend was then used as a coating applied to the polyethylene sheet, the substrate, which was then vacuum formed into a margarine cup. The product so formed is both a pigmented liner which does not bleed and thus contaminate the product stored in the container. Further, the pigmented polyvinylidene liner provides an oxygen barrier for the formed product.

Another run was made in order to determine the operability of butyl stearate as a pigment dispersant in a polyvinylidene chloride in solution. Ten parts by weight of pigment, Harmon R-6 Red Lake M, and 90 parts by weight of butyl stearate were admixed in a paddle blender operating at about 500 r.p.m. for 5 minutes to form a dye concentrate of the pigment and the butyl stearate. After the desired dye concentrate was formed, 0.5 part by weight of the dye concentrate was admixed in a paddle operating at about 50 r.p.m. with 99.5 parts by weight of the polyvinylidene chloride in solution. The resulting blend was then applied to a polyethylene sheet to form a coating on the sheet. The coated polyethylene sheet was then vacuum formed into a margarine tub. The coating on the polyethylene sheet serves as a pigmented liner which does not bleed and thus contaminate the product stored in the container, and at the same time provides an oxygen barrier for the container. Butyl stearate has been approved by the Food and Drug Administration and therefore its use on food containers, such as margarine tube, is permissible.

Many variations and modifications of the invention can be made by one skilled in the art without departing from the spirit and scope of the invention.

What is claimed is:

1. A process for producing a blend which comprises admixing a polymer selected from the group consisting of a polymer of 1-olefin having from 2 to about 4 carbon atoms and polymers of chloro-olefins having from 2 to about 4 carbon atoms, a pigment, and a dispersing agent selected from the group consisting of liquid polyisobutylene having a molecular weight of about 1000 and butyl stearate, wherein said dispersing agent is present in the range of about 0.1 to about 0.6 weight percent.

2. A process according to claim 1 wherein said polymer is in the form of fluff or pellets and is contacted with said dispersing agent prior to contact with said pigment.

3. A blend made according to the process of claim 1 in which said pigment is present in the range of about 0.5 to 2 weight percent.

4. A foamed ribbon formed from the blend made according to the process of claim 1 wherein said polymer is selected from the group consisting of polypropylene having a density ranging from about 0.89 to 0.92 and polyethylene having a density ranging from about 0.92 to 0.99 and said dispersant is liquid polyisobutylene having a molecular weight of about 1000.

5. The process comprising extruding said pigmented blend of claim 3 to form pellets; admixing said pellets and additional liquid polyisobutylene having a molecular weight of about 1000 to form a uniform wet blend; extruding said uniform blend in the presence of a blowing agent to form a foamed sheet; and stretching said foamed sheet to form an oriented sheet, said oriented sheet having substantially no bleeding or spotting of the pigment in said sheet.

6. A process which comprises admixing a pigment and a dispersing agent of liquid polyisobutylene having a molecular weight of about 1000 or butyl stearate to form a dye concentrate, admixing said dye concentrate with a polymer selected from the group consisting of a polymer of a 1-olefin having from 2 to about 4 carbon atoms and polymers of chloro-olefins having from 2 to about 4 carbn atoms to form a resulting blend, and applying said resulting blend to the surface of a substrate of a polymer of a 1-olefin having from 2 to 4 carbona toms or a polymer of a chloro-olefin having from 2 to about 4 carbon aotms to form a coating thereon.

7. A process according to claim 6 wherein said dispersing agent is liquid polyisobutylene having a molecular weight of about 1000 and said polymer of said blend is polyvinylidene chloride.

8. The article of manufacture formed by the process of claim 6 wherein said polymer of said blend is polyvinylidene chloride.

9. A process according to claim 7 wherein said resulting blend contains from about 0.5 to about 2 weight percent pigment; said substrate is a sheet of a 1-olefin polymer; and said sheet with said coating is then formed into a container having a pigmented liner.

References Cited

UNITED STATES PATENTS

| | | | |
|---|---|---|---|
| 2,558,053 | 6/1951 | Lee | 260—22 |
| 2,989,782 | 6/1961 | Barkhuff et al. | |
| 3,278,466 | 10/1966 | Cram et al. | 260—2.5 |
| 3,342,759 | 9/1967 | Short et al. | 260—2.5 |
| 3,404,104 | 10/1968 | Hill et al. | |

MURRAY TILLMAN, Primary Examiner

M. FOELAK, Assistant Examiner

U.S. Cl. X.R.

260—41, 33.6, 897, 31.2; 264—210, 211, 54; 117—138.8; 206—46; 220—65